United States Patent [19]

Caplygin

[11] 4,261,444
[45] Apr. 14, 1981

[54] DISC BRAKE ASSEMBLY

[75] Inventor: Dimitri Caplygin, Brighton-Le-Sands, Australia

[73] Assignee: Girlock Limited, Australia

[21] Appl. No.: 967,779

[22] Filed: Dec. 8, 1978

[30] Foreign Application Priority Data

Mar. 1, 1978 [AU] Australia .............................. PD3552

[51] Int. Cl.³ ............................................ F16D 65/02
[52] U.S. Cl. .................................................. 188/73.3
[58] Field of Search .................. 188/18 A, 71.1, 72.1, 188/72.3, 73.3

[56] References Cited

U.S. PATENT DOCUMENTS

| 3,708,043 | 1/1973 | Rath et al. | 188/73.3 |
| 3,768,604 | 10/1973 | Falk | 188/73.3 |
| 3,862,674 | 1/1975 | Vananrooy et al. | 188/73.3 |
| 3,887,045 | 6/1975 | De Hoff et al. | 188/71.1 X |
| 3,997,032 | 12/1976 | Kondo | 188/73.3 X |
| 4,031,986 | 6/1977 | Thompson | 188/73.3 X |

Primary Examiner—Duane A. Reger

[57] ABSTRACT

The invention provides an aluminium alloy disc brake assembly that overcomes rigidity problems encountered with the prior art whereby the improved assembly is constructed within a specific combination of housing, pad and piston dimensions by which the profile of the housing is circumferentially lengthened and reduced in height, the center of effort of the piston is raised with respect to the axis of rotation of the disc, and the disc pad ratio is reduced.

3 Claims, 4 Drawing Figures

DISC BRAKE ASSEMBLY

This invention relates to disc brake assemblies and in particular to a disc brake housing adapted for manufacture in light weight metal alloys, particularly aluminium alloys.

It has been found that improvements in the design of the front suspension of motor vehicles tends to reduce the scrub radii of the front wheels, that is, the distance between the steering axis and the tyre contact patch on the roadway. To achieve this, the wheel centres are becoming heavily dished outwardly to allow the king pin to be positioned as close as possible to a point directly above the tyre contact patch, thus reducing the scrub radii to the optimum extent. As the disc of a disc brake assembly is normally mounted on the stub axle between the king pin and the hub supporting the wheel centre, the space available for a disc brake assembly is at a premium.

It has been found that a disc brake assembly can be manufactured in nodular iron to meet the above requirements however the need for further weight reduction and thus energy conservation prejudices the use of this traditional material.

It has been found that if a disc brake assembly is manufactured in light alloy to the design of a nodular iron assembly, the housing is not stiff enough as the alloy bends approximately three times more easily than the iron. To obtain the high degree of stiffness required, the section across the housing becomes very bulky. The extra thickness of material required moves the neutral axis of the section further from the centre line of the piston or the line of loading. This means an increased bending moment in the section, with consequent disproportionate increase in volume of material. Aluminium housings manufactured in accordance with the prior art applicable to nodular iron housings are therefore unsatisfactory.

Our invention seeks to overcome the disadvantages of previously known aluminium housings. It has been found that an unexpectedly good result has been achieved by the combination of housing, pad and piston dimensions specified below. Specifically, the thickness of the housing has been reduced by up to 30% thereby allowing the present invention to fit within the ever increasingly restricted modern front suspension environments. Further, the centre of effort of the piston was, contrary to established practice, deliberately raised, achieving the efficiency of braking that has been reached using our invention.

In one form, the invention is applicable to a single sided caliper, that is a caliper having one or more pistons only on the inboard side of the caliper, said piston or pistons acting upon the disc via the inboard disc pad. The reaction causes the housing to slide across on known pins and apply load to the other side of the disc through the outboard pad, thereby completing the clamping action. The caliper used in a preferred form of the invention may be described as a pin slider caliper in that the housing is provided with two ears or flanges at opposite ends thereof which contain two parallel pins sliding in holes transverse to the plane of the disc.

In accordance with the present invention therefore there is provided a disc brake having in combination a housing made of aluminium alloy having a specific gravity of less than 3.0 and having an outer bridge ratio greater than 9:1 and an arc length to piston height ratio greater than 4.5:1 and a disc pad whose pad area ratio is less than 0.75:1. These ratios are defined below with reference to the drawings.

A disc brake assembly having the above defined housing pad and piston ratios react to give a hitherto unexpectedly good result in terms of low weight and profile for required strength and deflection characteristics.

A preferred embodiment of the present invention is depicted in the attached drawings in which.

Figure 1:
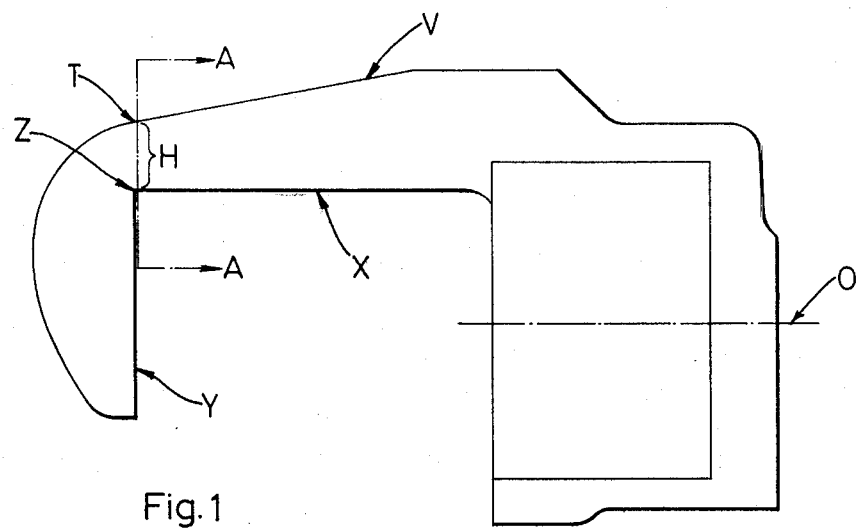
FIG. 1 is a transverse elevation section through a housing manufactured in accordance with the present invention.
Figure 2:
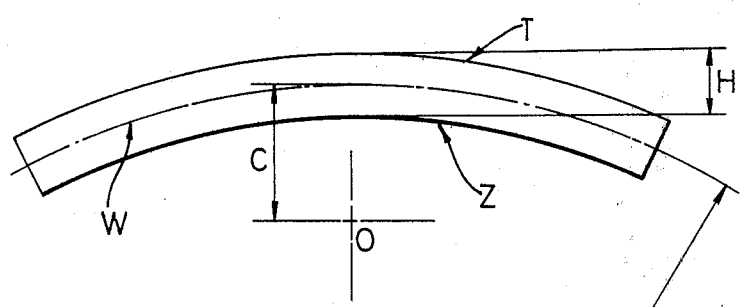
FIG. 2 is a longitudinal elevation section along the line A—A of FIG. 1.

With reference to FIGS. 1 & 2 the planes V and X represent maximum swept outlines of the caliper related to the axis of rotation of the wheel R. The arc T (FIG. 2) is defined as the intersection of planes V and Y and the arc Z is defined as the intersection of planes X and Y. The arc W is equally spaced between T and Z and its length is defined by the extremities of the caliper bridge. The arcs T, Z and W are by their definition arcs of circles with centres on the axis of rotation of the wheel R. The 'bridge height' is defined as the radial distance between T & Z and is denoted H. The point O in FIG. 2 is a point on the piston centre-line. The 'piston height' C is the distance from O to the arc W.

The 'outer bridge ratio' is defined as the length of arc W divided by the bridge height H.

The 'arc length to piston height ratio' is defined as the length of arc W divided by the piston height C.

Figure 3:
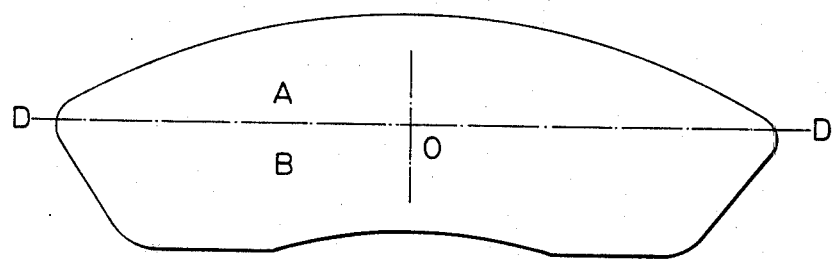
FIG. 3 is a side elevation of a disc brake pad illustrating the nature of the third essential feature defined above and, FIG. 4 is a perspective section view of the improved anchor bracket.

FIG. 3 represents an outline of the friction pad area which contacts the disc. The 'pad area ratio' is defined as the ratio of pad areas above and below the line DD, ie. A divided by B. DD is the horizontal line passing through the piston centre line O. The drawings clearly illustrate the unexpectedly long housing (in the direction of the circumference of the disc) in relation to disc diameter and the unexpectedly high centre of effort of the piston when used in relation to the housing of length defined above, the two foregoing features being in combination with a low pad area ratio; that is area 'A' divided by area 'B' in FIG. 3.

Figure 4:
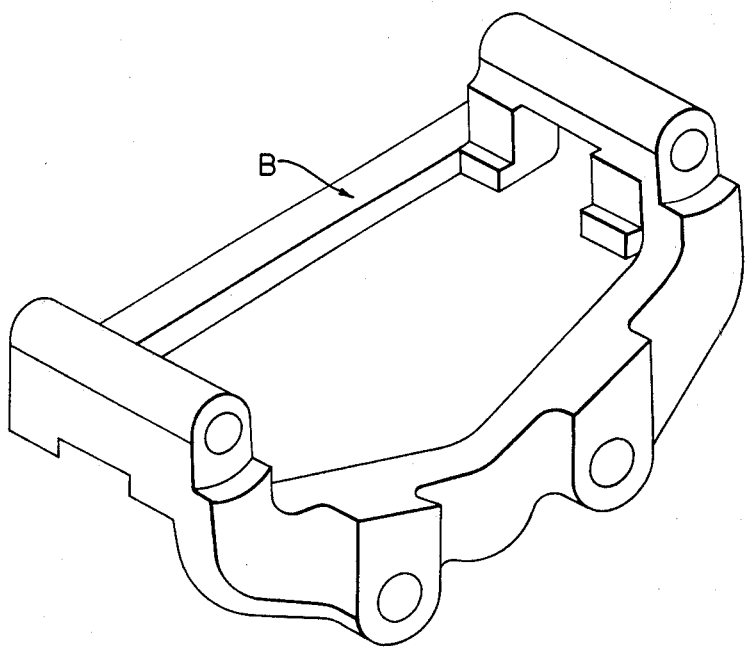

Although the above housing will function satisfactorily when mounted on a known anchor bracket, an embodiment of the invention includes use of the housing defined above in conjunction with an improved light weight bracket depicted in FIG. 4. The design of the improved anchor bracket has been formulated to ensure the housing is used as a brace and shares in transferral of the load under braking from the front to the rear of the bracket. An anchor bracket in accordance to prior art takes the whole load to the front leg only. However, the improved anchor bracket in accordance with the present invention provides a tie bar B between the legs of the outboard abutments. This type of bracket transfers the load from the front to the rear of the assembly and causes the whole combination of anchor bracket and housing to accept the load evenly.

While we have described the improved brake assembly with reference to the embodiment described above, it is to be appreciated that the inventive concept may be applied to other brake assemblies without departing from the spirit of this disclosure. The claims defining the invention are as follows:

I claim:

1. A disc brake having in combination a housing made of aluminium alloy having a specific gravity of less than 3.0 and having an outer bridge ratio greater than 9:1 and a bridge arc length to piston height ratio greater than 4.5:1 and a disc pad whose pad are ratio is less than 0.75:1, wherein said disc pad area ratio is defined as the ratio of pad areas above and below a horizontal line passing through a piston centerline.

2. A disc brake as claimed in claim 1 wherein the caliper is a single sided caliper.

3. A disc brake as claimed in claim 1 or 2 including an anchor bracket provided with a tie bar between the legs of the outboard abutments of the bracket.

* * * * *